June 2, 1959 S. TYSZKIEWICZ 2,889,403

SOUND RECORDING MACHINES

Filed Aug. 5, 1955 3 Sheets-Sheet 3

United States Patent Office 2,889,403

Patented June 2, 1959

2,889,403

SOUND RECORDING MACHINES

Stefano Tyszkiewicz, Rome, Italy

Application August 5, 1955, Serial No. 526,609

Claims priority, application Italy August 7, 1954

5 Claims. (Cl. 179—6)

This invention relates to improvements in machines of the type comprising a counter capable of indicating the results of certain operations carried out on said machines and a device for optically recording on a support readings on the counter, e.g., for printing on a paper tape a numeral exhibited at any desired moment by the counter, and related to the operation of the machine.

It is an object of this invention to provide a means by which it will be possible to print on said support additional conventional signs such as letters, figures, etc., simultaneously with the printing of the readings on the counter associated with the machine, in order to effect an optical record of additional information concerning the operation of the machine equipped with the counter.

It is a further object of the invention to provide a supplementary device for use in connection with electric recording, and reproducing machines, comprising a counter which constantly indicates the position of the sound-carrier with respect to the recording and reproducing head, and a device for optically recording on a support the readings on the counter, which makes identification of the sound source on a certain part of the record easy and quick.

Another object of the invention is the provision of means for making possible remote control of both the electric recording and reproducing machine and said supplementary device preferably, but not exclusively, by means of an automatic telephone provided with a dialling disc.

Figures 1, 2, 3, 4:
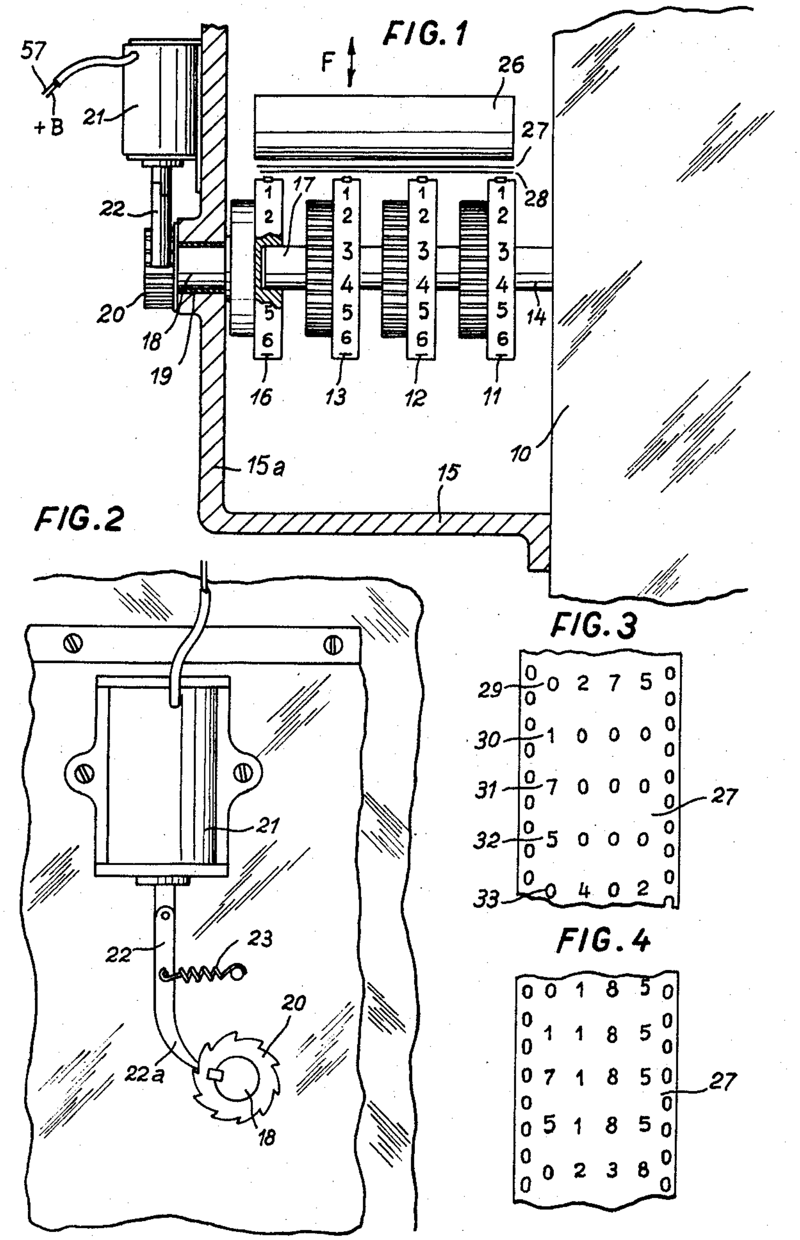
Figure 5:
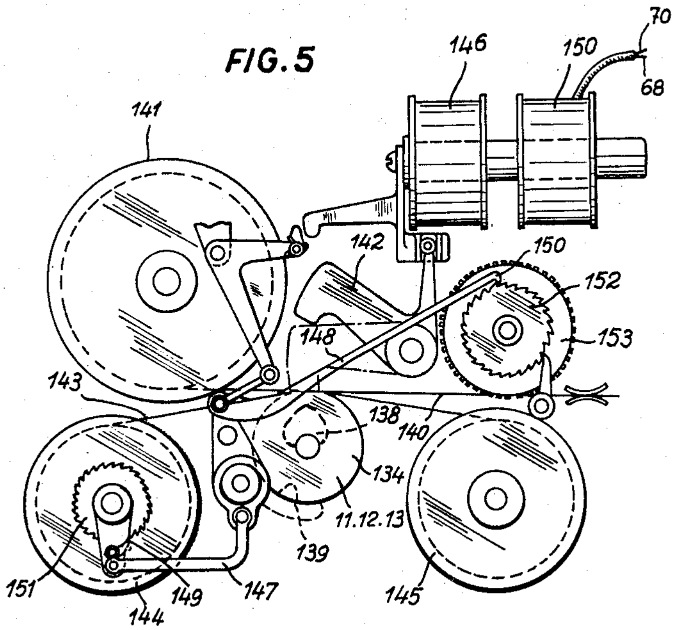
Figures 2A, 7, 8:
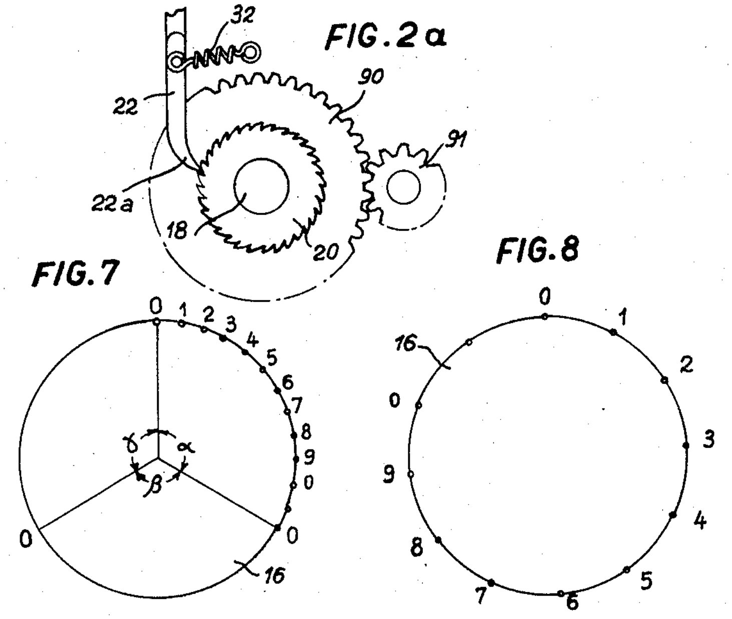
Figure 6:
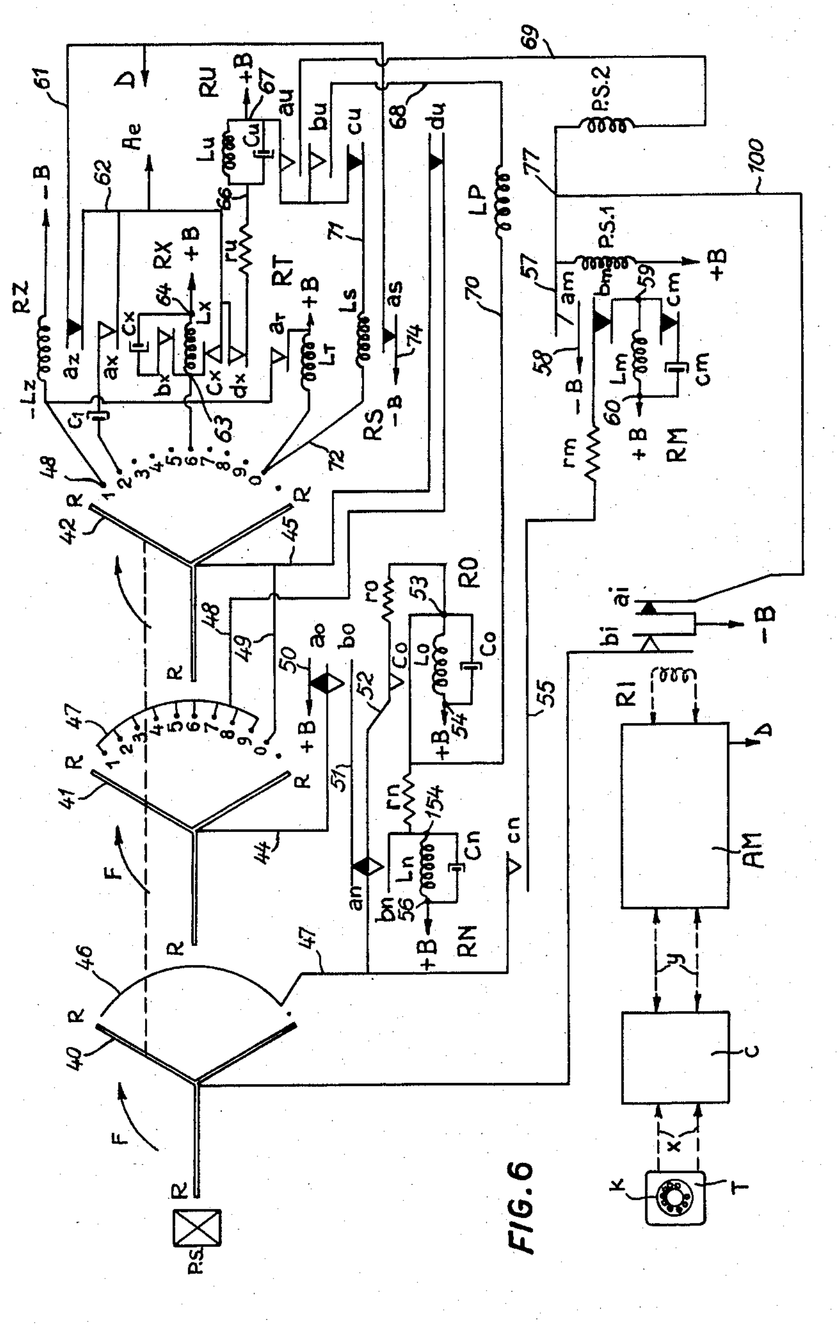

Further characteristic features and advantages of this invention will be understood from the appended description referring to the accompanying drawings which show by way of example only some embodiments thereof. On the drawings:

Figure 1 is a part sectional side view of a constructional detail of one of the counters associated with the device for recording and reproducing sound of the above described type, Figure 2 is a front view, Figure 2*a* shows a modification of a constructional detail of the structure according to Figures 1 and 2, Figure 3 is a plan view of a tape section on which the sound record period and characters corresponding to the initials or designation of the person having effected the sound record are optically recorded, Figure 4 is a view similar to Figure 3 of a tape section on which figures have been printed by a modified mechanism, Figure 5 is a diagrammatical side view of the mechanism controlling the hammer and feed of the paper tape and inking ribbon, Figure 6 is a wiring diagram of a circuit adapted to control some mechanisms pertaining to the unit shown in Figure 1, Figure 7 is a diagrammatic view of a constructional detail of the unit shown in Figure 1, and Figure 8 is a diagrammatic view of a modified construction.

In Figure 1, 10 diagrammatically denotes the casing of the apparatus for recording and reproducing sound, for instance the apparatus disclosed by U.S. Patent No. 2,653,190; 11, 12, 13 denote three discs carrying at their outer periphery at equal distances the figures 0 to 9 and supported by the shaft 14. The discs are associated with a counter which is continuously operated (but for short interruptions during which its reading is printed on the paper tape and the counter is zeroised) by the spindle of either of the unwinding or winding spools (not shown) for the magnetic tape or wire acting as sound carrier.

15 denotes a metallic frame secured to the casing of the apparatus 10 for instance by means of screws and carrying a fourth disc 16 provided on its outer periphery with figures from 0 to 9. The figures might be replaced by letters or other characters. The disc is recessed at its face near the disc 13 for journalling therein the end 17 of spindle 14. The disc 16 is securedly fixed to a pivot 18 extending through the vertical wall 15*a* of the frame 15 and rotatably mounted therein through the interposition of a bearing 19. The end of the pivot 18 projecting from the frame 15 has keyed thereto a pinion 20, which is driven by an electromagnetic impulse motor 21 secured to the vertical wall 15*a* of the frame 15 through the interposition of a rod 22 hinged to the movable armature of the motor. The rod 22 is provided at its end near the pinion with a tooth 22*a* adapted to become engaged between the teeth of the pinion 20.

The rod 22 is acted upon by a spring 23 which permanently holds the end 22*a* of the rod 22 in contact with the teeth of the pinion 20.

The stroke of the movable armature of the motor 21 is calculated so that on reception of impulses the pinion is fed step by step, successive figures being brought to the top thereof.

The ends of the leads feeding current to the winding of the motor 21 are indicated by 57 and +B.

The arrangement of the motor 21 is such that rotation of the pinion 20 together with pivot 18 and wheel 16 takes place on energising of the winding (not shown in Figures 1 and 2) of the motor 21.

A hammer 26 overlies the top of the set of discs 11, 12, 13 and 16 and is mounted capable of displacement in the direction of the common axis of shaft 14 and pivot 18. A paper tape 27 extends between two spools and 28 an inking ribbon likewise extending between two spools.

Further constructional details of the unit shown in Figure 1, more particularly the devices oscillating the hammer 26, feeding the paper tape 27 and inking ribbon 28, zeroising the discs on the counter and disc 16 are shown in Figure 5 and are described in detail in U.S. Patent No. 2,653,190.

The difference in structure between the mechanism oscillating the hammer 26, feeding the tapes 27 and 28 and possibly zeroising the counter 11, 12, 13 disclosed by U.S. Patent No. 2,653,190 and the mechanism shown in Figure 5 resides substantially in the provision of the relay 150 which upon being energised acts on the mechanism similarly to relay 146 and automatically comes into action upon rotation of the disc 16 by the motor 21.

The motor 21 is re-started as operation of the relay 150 ceases and automatically restores the disc 16.

This operation of the arrangement is determined by the characteristics of the electric control circuit associated with the device actuating the recording apparatus 10.

The hammer 26 could be divided, one of the sections being controlled by the relay 146 and associated with the discs 11, 12, 13, the other section being associated with the disc 16.

However, the mechanism for feeding the tape 27 and ribbon 28 should then be separately driven by each of the relays 146, 150.

The section of the hammer which cooperates with the disc 16 may have incorporated in it a device such as a watch of known type capable of printing time on the paper tape 27.

The unit works in the following manner:

Upon recording on a certain length of magnetic support for instance of a wire or tape travelling past the magnetic head (not shown) of the recording apparatus, the counter 11, 12, 13 indicates a certain numeral proportional to the period of recording effected.

This numeral is reproduced in a known manner by actuating the relay 146 (Figure 5) on the paper tape 27 (see 29, Figure 3). During printing of the said numeral on the paper tape 27 the disc 16 exhibits the figure 0 in front of the tape, this figure being printed, as will be seen from Figure 3, beside the numeral, say 275, denoting the period of the record effected.

When the counter 11, 12, 13 is such that upon printing its reading on the paper it is zeroised after printing, the discs 11, 12, 13, 16 face the tape by the figure 0.

When it is desired to effect a further record and leave on the tape 27 a coded indication which distinguishes for example the person who is about to effect recordal, suitable devices are first of all operated for actuating the relay 21 by transmitting electric impulses thereto. This results in rotation of the pinion 20 which performs a certain number of steps equalling the number of impulses transmitted to the relay 21. If the number of impulses transmitted was for instance three, the disc 16 faces the tape 27 by the figure 3. The hammer 26 is then oscillated by actuating a suitable electric circuit or even automatically, and snaps near the disc shaft, the figure 3 being printed on the paper tape 27 at the level of the disc 16 and figure 0 being printed at the level of the discs 13, 12, 11 as indicated at 30 in Figure 3.

After printing has taken place the paper tape 27 and inking ribbon 28 are advanced by one step, the disc 16 being zeroised.

By transmitting electric impulses to the motor 21 other figures can be formed. When a number distinguishing the person who is about to effect recordal is for instance a three-figure number (175) groups of figures are printed on the paper tape which are indicated in Figure 3 at 30, 31, 31. Upon printing on the tape 27 the corresponding number (175), the user records a message on the magnetic wire of tape of the apparatus 10 by effecting the necessary controls.

On completion of the record the reading on the counter 11, 12, 13 is a number (for instance 402) proportional to the length of the recorded message. This number can be printed on the tape 27 by actuating the relay 146. The figure 0 is printed beside the said number, inasmuch as the drum 16 was restored directly after printing the figure 5 in a manner to be explained hereafter.

The resulting group of figures is indicated at 33 in Figure 3.

In certain cases it may be convenient for the counter 11, 12, 13 to be deprived of the zeroising device. The reading thereon on completion of each record are gradually increasing numbers which indicate the sum of the periods of the individual messages recorded on the magnetic support such as a wire, taper like.

This arrangement is very advantageous, inasmuch as it facilitates location of the various messages for repeatedly reproducing them, when required.

In order to effect reproduction it will be sufficient to locate on the paper tape the numeral denoting the end of the message in question and reverse rotation of the spools carrying the magnetic support such as wire or tape till the counter on the unit (not shown) but disclosed for example in U.S. Patent No. 2,652,988 carrying the magnetic head and spools exhibits a numeral denoting the beginning of the message.

Location is facilitated by the provision on the paper tape of coded numbers printed at the level of the disc 16 distinguishing the original and other characteristics of the individual messages.

The spool motion is then reversed and the recording apparatus is arranged for reproducing sound.

The numbers printed on the paper tape when the counter 11, 12, 13 is of the type indicating the sum of the periods of the messages recorded on the magnetic past the magnetic head are shown in Figure 4.

The electric circuit shall now be described which controls the mechanisms just described for printing the coded characters on the paper tape 27 on which the figures indicating the period of the records effected on the magnetic tape or wire by means of the apparatus 10.

This circuit shown in Figure 6 comprises the automatic telephone T provided with a dial K and connected by the line X with the automatic exchange C, and by line Y with the unit AM comprising a device for automatic blocking and release of the line fed through terminal D and an impulse amplifier connected in turn with the relay RI which controls contacts *ai, bi,* opening and closure of which generates electric impulses in the remaining circuit parts.

The circuit comprises moreover a selector actuated by an impulse motor diagrammatically shown at PS, of which the winding P.S.1 is connected between the positive pole (+B) of a source of direct current supply and over the lead 100 and contact *ai* to the negative pole (—B) of the same source.

The selector comprises a set of rotary contacts cooperating with banks of stationary contacts. In the example shown they are of the conventional type, in which the movable contacts are formed with three arms securedly fixed therebetween and staggered through 120° to one another, the stationary contacts forming banks situated within arcs 120° wide intermediate the inoperative or rest positions R of the selector.

The first arm 40 of the selector cooperates with an arc-shaped through contact 46 connected to the set of relays RO, RN and RM adapted to reverse the polarity of the arm 42 cooperating with the stationary contacts of the bank 48, each of which is connected to one pole of one or more self-energising relay controlling the various functions of the machine 10 (see Fig. 1) which is in this case the sound recording and reproducing apparatus 10.

The contact 1 has a relay RZ connected thereto which on being energized acts on the contact *az* and breaks the self-energising circuits for the relays connected to the various contacts of the bank 48.

The contact 0 has connected thereto the relay RS which on becoming energised cuts out supply to the device for automatic release of the line between the telephone apparatus and the unit through the terminal D.

The set of the delay-action switches RO, RN and RM is further designed to automatically restore to their inoperative position the movable selector arms after a certain delay by transmitting to the winding P.S.1 impulses till the selector arms have moved forward in rotation through an angle such that their position with respect to the stationary contacts of the contact banks is again similar to the position shown in Figure 6.

The part just described is substantially similar in structure and operation to the circuit according to my abovementioned Italian Patent No. 504,613. In order to suit this circuit for the purposes of this invention a movable contact 41 has been added thereto or, better, utilised for selectors available in the trade are usually equipped with a plurality of movable contacts and associated banks of stationary contacts. The stationary contact bank 47 of the movable contact 41 comprises nine short-circuited stationary contacts and one independent tenth contact (0). This unit is interposed during the operation of the selector between the movable contact 42 and one of the poles of direct current supply source.

Further added parts are the relays RX, RU, RT. The relays RX, RU are delayed in disenergizing and are adapted to connect in the circuit the windings PS.2 and LP pertaining to the impulse motor 21 which rotates the disc 16 and relay 150, respectively, the latter, controlling oscillation of the hammer 26 (see Figures 1, 2 and 5).

The relay RT connected at one end to the contact 0 of the contact bank 48 is designed to make the relay RZ operative and disenergize the relays RX and RU on completion of printing of the coded characters on the paper tape 27.

By the selector structure shown in Figure 6 the arrangement of the figures (or other characters such as letters) on the periphery of the disc 16 is as diagrammatically shown in Figure 7.

In this case three groups of figures are distributed over arcs each 120° wide. This is objectionable inasmuch as the figures are too small. In order to make the figures larger, the latter can be distributed over the full circumference of the disc 16 in the manner shown in Figure 8. With this structure of the disc 16 a drive gear (transmission ratio: 1 to 3) should be interposed between the pinion 20 driven by the impulse motor 21 and the pivot 18 carrying the disc 16, as shown at 90, 91 in Figure 2*a*.

The device operates as follows.

When the arms 40, 41, 42 start rotating under the action of the motor PS to which electric impulses are transmitted through lead 100 and +B by the relay RI energised by the movement of the dial of the telephone T and reach the arm 40, leading portion of the arc 46 and arms 41, 42 the contacts denoted by 1 of the associated banks of contacts 47, 48. The circuit of the winding L*o* and the relay RO between the positive (+B) and negative (−B) pole of the direct current supply source are closed. Since the relay RO is delayed, it does not act immediately, the contacts *ao*, *bo* and *co* remaining in their inoperative position shown in Figure 6. The arm 41 which is further connected to the positive pole (+B) through contact *ao* transmits the positive voltage to the bank of contacts 47, then through lead 48, contact *du* and lead 45 to the arm 42, then to the winding L*z* of the relay RZ. The relay RZ which acts instantaneously becomes energized opening the contact *az*, thereby cutting out the connection between the negative pole (−B) of the supply source and the self-energizing circuits of some relays of the sound recording apparatus.

The relay RO is then energised after a certain delay determined by the provision of the condenser C*o*, opens the contact *ao* and closes contacts *bo* and *co*. Opening of the contact *ao* and closure of the contact *bo* cuts out connection the positive pole (+B) from the supply source and arm 41 and connects the latter to the negative pole (−B) of the source thereby reversing polarity. Closure of the contact *co* closes the circuit of the winding L*n* of the delay-action relay RN which therefore does not act instantaneously.

When on further rotation of the movable contacts the arm 42 comes over the contact 6, the circuit of the winding L*x* of the relay RX is closed. Energising of the relay RX results in closure of the contact *ax* which establishes connection between the lead 62 and contact 2 through the condenser C1, hence with a relay (not shown) of the sound recording apparatus which is energised and arranges the said apparatus for dictating.

Closure of the contact *bx* connects the electrolytic condenser C*x* between the ends 63, 64 of the winding L*x*. Closure of the contact *cx* connects the end 63 of the winding L*x* to the negative pole (−B) of supply source and self-energizes it independently of the position of the arm 42. Closure of the contact *dx* connects the end 66 of the winding L*u* of the relay RU to the negative pole (−B). The relay RU is such that its action is strongly delayed with respect to the delay in operation of the other relays provided in the circuit and is therefore left ineffective during a certain period.

In the meantime the relay RN comes into action and moves the contacts *an*, *bn* and *cn* so that on opening the contact *an* it disconnects the negative voltage from arms 41, 42. Closure of the contact *bn* closes the self-energizing circuit for the winding L*n* of the relay RN, closure of the contact *cn* energizing the relay RM.

The relay RM operates with a slight delay due to the provision of the capacitor C*m* which becomes loaded. On completion of loading of the capacitor, the relay RM opens contacts *cm* and *bm* disconnecting the end 59 of the winding L*m* from the negative pole. Opening of the contact *bm* disenergizes the winding L*m* and successively closes the contacts *bm* and *cm*. The contacts *am*, *bm* and *cm* therefore close and open at a rhythm determined by the electric properties of the relay RM.

Whenever the contact *am* closes the supply circuit for the winding PS1 provided in the motor PS controlling movement of the arms 40, 41, 42 is closed. The motor PS is effective until the set of arms rotates further forward to their inoperative position. On reaching this position the arms are removed from the contacts on the banks 46, 47, 48, the relays RO, RN, RM becoming disenergised.

On elapsing of its delay period the relay RU comes into action and closes the contact *au* thereby supplying positive voltage to the winding PS2 through lead 69; closure of the contact *bu* connects the positive voltage to the end of the winding L*p* through the lead 68. The winding L*p* pertains to the relay 150 (Figure 5) which is associated with the drive gear oscillating the hammer 26 which presses the paper tape against the periphery of the discs 11, 12, 13 and 16. On the return stroke of the hammer 26 the discs are zeroised in a known manner, the blank paper tape and inking ribbon being fed forward. Opening of the contact *cu* disconnects the positive voltage from the relay RS which controls release of the line between the telephonic apparatus and circuit interposed between the latter and recording apparatus. Opening of the contact *du* breaks the circuit between the arm 42 and first nine contacts (1 to 9) of the bank of contacts 47. The circuit is now ready for transmitting the impulses to the motor 21 which drives the disc bearing the figures 16. At the same time the recording apparatus is prepared for dictating, inasmuch as the motor has been started upon energisation of the relay RX, that is, after the arm 42 has moved over the contact 6 on the bank of contacts 48.

*Example*

Any numeral selected between 1 and 9, for instance 3 is set by means of the setting disc of the automatic telephone operated by the user.

The impulses set up in relay RI from the movement of the dial are transmitted through the lead 100 to the winding PS1 of the motor 1 which moves the movable arms or contacts 40, 41, 42 of the selector to the position in which the arms 41 and 42 are superimposed on the contacts indicated by 3.

This takes place simultaneously with the coming into action of the winding PS2 of the relay or impulse motor 21 (Figures 1 and 2) which is energised three times thereby rotating the disc 16 which comes by its figure 3 adjacent the paper tape and in front of the hammer 26 (Figure 1).

An instant later the relay RO is energised and closes contact *co* connecting the negative voltage to the winding L*p* of the relay 150 through the lead 70. The relay RP is energised and oscillates the hammer 26 which snaps against the paper tape 27 printing thereon the figures situated at the top of the discs, namely 11, 12, 13, 16. Closure of the contact *co* also energizes the relay RN which in turn closes after a short delay the contact

*cn* thereby energizing the relay RM which closes and opens the contact *am* thereby transmitting impulses to the windings PS1 and PS2 which act to restore the set of arms 40, 41, 42 to their inoperative or rest position and the disc 16 to its position in which the character 0 (see Figures 7 and 8) faces the paper tape and hammer. In practice said character can be omitted.

The above described process can be repeated a plurality of times by setting by the setting disc any of the figures from 1 to 9 and causing corresponding figures to be printed on the tape 27 aligned in a column orientated in the longitudinal (or transversal, if desired) direction of the tape as shown in Figures 3 and 4.

In order to prepare the whole arrangement for dictating the figure 0 is set by means of the dial K, thereby generating ten successive impulses which cause the arms 40, 41, 42 to take the position in which the ends of the arms 41, 42 are superimposed on the contacts marked 0.

After an inherent delay period the relay RO acts to open contact *ao* and close contact *bo*, thereby reversing polarity in the previously described manner of the arm 41, consequently of the arm 42.

This results in closure of the supply circuit for the coil LT of the relay RT which closes contact *at* thereby suppyling a positive voltage to the winding L*z* of the relay RZ. The contact *az* is then opened, the self-energizing circuits for the relays provided in the sound recording apparatus and the relay RX being closed. Consequently, the motor of the recording apparatus is stopped, the electric circuit of the sound recording apparatus being fully returned to its inoperative position.

Disenergizing of the relay RX which occurs with a certain delay causes inter alia the contact *bx* to open, thereby breaking the circuit supplying current to the winding L*u* of the relay RU (the relay RU being as mentioned above materially delay in disenergizing).

In the meantime closure of the contact *co* of the relay RO closes the circuit of the winding L*n* of the relay RN as well as the feed circuit for the winding L*p* of the relay 150 which oscillates the hammer 26. The relay RN then comes into action and closes the contact *cn* thereby energising the relay RM which acts to move the sets of arms 40, 41, 42 to their inoperative position in the above described manner and operate the winding PS2 which zeroises the disc 16 (Figure 1). At the end of these steps only the relay RU is definitely disenergized so that contacts *au* and *bu* open, disconnecting the positive voltage from the end of the winding PS2 and positive voltage, respectively from the end of the winding L*p* of the relay RP. At the same instant the contacts *cu* and *du* close supplying positive voltage to the winding L*s* of the relay RS which causes the automatic release of the line and connects the arm 42 to the bank of contacts 47.

The full circuit is therefore restored to its initial inoperative position shown in Figure 6.

The arrangement has been described above more particularly with reference to its use for well-defined purposes in a unit comprising a sound recording and reproducing apparatus and a device for remote control of the said apparatus from an automatic telephone, but can be employed for purposes other than described.

What I claim is:

1. An electric device for controlling, by utilizing normal telephone network, the operations of an electric dictating machine of the type in which all operations are controlled through electric circuits the closing and opening of which is effected by self-holding relays and provided with a recording and reproducing head, with means for moving a sound carrier near said head, with a counter operatively connected with said means for moving the sound carrier for constantly exhibiting a numeral related to the position of said carrier with respect to said head, said counter comprising a number of coaxial discs carrying numerals 0 to 9 in relief distributed at equal intervals on their outer periphery and rotatably mounted on a shaft supported by the machine, with a supplementary disc located adjacent said discs of the counter, coaxial thereto and having the same diameter as said discs of the counter and carrying a plurality of signs in relief distributed at intervals on the outer periphery thereof, with means for printing on a paper tape the readings on the said discs, said means comprising a hammer and an electromagnet for actuating said hammer, and finally an electric impulse driven motor for rotating supplementary discs, said device comprising a D.C. source, a selector having a set of three simultaneously rotatable contacts each comprising three arms staggered through 120° and three banks of stationary contacts situated within arcs wide 120° intermediate the rest positions of said movable contacts of the selector, an electric impulse driven motor for driving step by step said rotatable contacts of the selector, said motor having a winding, one end of which is connected to the positive pole of said D.C. source, means for connecting the other end of said winding to the negative pole of said source, said means being responsive to electric impulses generated by rotating the dial of a telephone apparatus and transmitted to said device through a telephone network, the first of said banks of stationary contacts being an arc-shaped continuous contact, the second of said banks comprising ten equally spaced contacts, nine of said contacts being connected therebetween, the third of said banks comprising ten equally spaced contacts separated from each other, their spacing being such that the arms of the second and third rotatable contacts are displaced from one stationary contact to the next when the motor driving the selector receives one impulse, the first rotatable contact of the selector being normally connected to the negative pole of said D.C. source, the second rotatable contact being normally connected to said arc-shaped contact of the first bank, a first and a second lead for connecting said third rotatable contact to said first nine and to the tenth stationary contacts of said second bank, respectively, a normally closed contact in said first lead, the stationary contacts of said third bank, excepting the first and one of the remaining contacts, being connected to said self-holding relays controlling the operations of the dictating machine, means for automatically restoring the movable contacts of the selector to their inoperative position after they have been displaced upon receiving by the motor driving the selector of electric impulses generated by moving the dial of a telephone apparatus, a self-holding relay connected to one of said remaining stationary contacts of said third bank designed for controlling operation of said motor driving said supplementary disc and said electromagnet operating said hammer, a strong delayed action relay energized upon actuation of said last mentioned self-holding relay, a first and a second normally open contact closing upon energization of said strong delayed action relay and inserted between the positive pole of the D.C. source and one end of the winding of said electromagnet and of the motor for driving the supplementary disc, respectively, the other end of the first of said windings being connected through a normally open contact to said arc-shaped stationary contact of said first bank, the other end of said winding being connected to the other end of the winding of the motor actuating said selector, a third normally closed contact opening upon energization of said strong delayed action relay inserted in said first lead connecting said third rotatable contact of the selector to said first nine stationary contacts of said second bank, the delay of said strong delayed action relay being such that it acts upon the associated contacts after the rotatable arms have been restored to their inoperative position by rotating them forwardly starting from the position at which said third rotatable contact of the selector has been superposed on the stationary contact of said third bank connected to said self-holding relay designed for controlling the operation of said electromagnet and said motor driving said supplementary disc.

2. The device as claimed in claim 1, wherein an instant action relay connected with its one end to the first stationary contact of the third bank and a normally closed contact inserted in the feed line of the self-holding relays controlling the operation of the dictating machine, are provided for disenergizing said relays when a new order is transmitted to the machine by rotating the dial of the telephone apparatus, said instant action relay being connected with its other end to the negative pole of said D.C. source.

3. The device as claimed in claim 2, wherein a first and a second instant action relay connected with their one end to the tenth stationary contact of the third bank and with the other end to the positive pole of said D.C. source, a normally open contact closing upon energization of said first stationary contact of said third bank, and a normally closed contact opening upon energization of said second relay are provided, said last mentioned contact being inserted in the feeding line for the release means between the telephone network and the said device.

4. The device as claimed in claim 1, wherein between the negative pole of the D.C. source and said other ends of the windings of the selector driving and the supplementary disc driving motors a normally open contact and between said negative pole and the first rotatable contact of the selector a normally closed contact, are provided, said contacts closing and opening, respectively, simultaneously upon transmitting to said device electric impulses generated by rotating the dial of the telephone apparatus.

5. A device as claimed in claim 1, wherein said means for automatically restoring the movable contacts of the selector to their inoperative position after they have been displaced upon receiving by the selector driving motor of electric impulses generated by moving the dial of the telephone apparatus comprises three relays and three contacts for each relay, one end of the winding of each of said relays being connected to the positive pole of said D.C. source, one contact of said first relay being normally closed and inserted between the positive pole and the second movable contact of said selector, the second contact being normally open and inserted between said second rotatable contact of the selector and the first rotatable contact of the latter, the third contact of said first relay being normally open and inserted between the other end of the winding of said second relay and said first rotatable contact, the other end of the winding of said first relay being also connected to said first rotatable contact and having such a delay that it becomes operative after the second and third rotatable contacts of the said selector reaches the first stationary contact of the associated banks, the first contact of said second relay being normally closed and inserted between said first rotatable contacts of the selector and said second contact of said first relay, the second contact of said second relay being normally open and inserted between the other end of the winding of said second relay and the first rotatable contact of the selector, said other end of the second relay being further connected to the other end of the winding of the electromagnet operating said hammer, the third contact of said second relay being normally open and inserted between the said first rotatable contact of the selector and the other end of said third relay, the delay of said second relay being such that it becomes operative after energizing of the self-holding relays controlling the action of the electromagnet and the motor driving said supplementary disc, the first contact of said third relay being normally open and inserted between the negative pole of said D.C. source and said other ends of the windings of the motors which drive the selector and the supplementary disc, the second contact of said third relay being normally closed and inserted between the other end of the winding of said third relay and said third contact of said second relay, the third contact of said third relay being normally closed and inserted between the other end of its winding and a condenser connected to the end of the latter connected to the positive pole of said D.C. source, said condenser being designed to determine a slight delay in operation of said third relay after the closure of the third contact of said second relay.

References Cited in the file of this patent

UNITED STATES PATENTS

| | | |
|---|---|---|
| 1,295,110 | Brown | Feb. 25, 1919 |
| 2,005,108 | Pudelko | June 18, 1935 |
| 2,148,861 | Kall | Feb. 28, 1939 |
| 2,196,194 | Cooper | Apr. 9, 1940 |
| 2,653,190 | Godeck | Sept. 22, 1953 |
| 2,654,609 | Shepherd | Oct. 6, 1953 |
| 2,660,621 | Billar | Nov. 24, 1953 |
| 2,757,062 | Hood | July 31, 1956 |